Patented Feb. 2, 1937

2,069,243

UNITED STATES PATENT OFFICE 2,069,243

MANUFACTURE OF KETENE

George D. Graves and Crawford H. Greenewalt, Wilmington, Del., assignors to E. I. du Pont de Nemours & Company, Wilmington, Del., a corporation of Delaware No Drawing. Application July 28, 1934,
Serial No. 737,388

17 Claims. (Cl. 260—123)

This invention relates to methods of manufacturing ketene from vapors of organic compounds which are decomposed by heat into substances including ketene, and more particularly, relates to a method of manufacturing ketene from acetone at elevated temperatures.

This case is a continuation in part of application Serial No. 618,702, filed June 22, 1932.

Heretofore ketene has been prepared by passing acetone vapors thru a hot reaction chamber at temperatures up to about 700° C. and usually in the presence of so-called "preventive catalysts". In these processes the yield of ketene has rarely approached 80% of the theoretical, while the conversion of acetone vapors to ketene in one run has been exceedingly low, usually around 10%. Also mass velocities and space-time-yields altho not stated by other investigators were apparently below 500 lbs./sq. ft./hour and 75 lbs. of ketene per cubic foot of reactor volume per hour, respectively. In U. S. Patent 1,723,724, granted August 6, 1929, to Clarke and Waring, a process of making ketene is disclosed whereby the use of preventive catalysts can be avoided, a network of copper being employed in the reaction chamber to insure proper heat distribution. In this patent it is stated that if the conditions of heating are properly controlled, yields up to 80% may be obtained from acetone, the temperature disclosed being in the neighborhood of 675° C. and the only requirement as to time of contact of the gases in the heated zone being less than 5 seconds. Conversions per pass were not given.

Prior investigators have not approached our highly economical results, i. e., good absolute yields combined with very high space-time-yields secured by the use of high temperature, very short time of contact and high mass velocities. Our investigations show that results of this order are not to be obtained using the packed reactors of the prior art for the reason that with such equipment any attempt to reach the high mass velocities which we would use would result in excessive back pressure which has a marked effect in increasing the decomposition to products other than ketene.

An object of the present invention is to provide a method of manufacturing ketene from acetone and other organic compounds which are decomposed by heat into substances including ketene with higher yields and higher conversions than have heretofore been obtained. A further object is to provide such a method wherein a relatively small reaction chamber can be employed in large scale production of ketene. A further object is to provide a method whereby extremely favorable results may be obtained by employing empty reaction chambers, avoiding the metallic network packing and preventive catalysts heretofore considered necessary in the production of ketene from acetone. A further object is to avoid local overheating of the vapors of acetone and also to control the contact time of the vapors in the high temperature zone in order that the ketene yield will be above 65%. Other objects of the invention will be apparent from the description given hereinafter.

One of the most useful and easily defined "yardsticks" for comparing the invention with the prior art is the concept of mass velocity which has the dimensions of mass flowing across unit area in unit time. This concept is related to time of contact which has the dimensions of reactor volume per unit volume of reacting substance per unit time and can be derived from it by transforming the volume of reacting substance into mass and the volume of the reactor into cross-sectional area. Thus, mass velocity is a more concrete specification since it is independent of an arbitrary statement of reactor length and temperature.

These objects are accomplished according to the present invention by passing an organic substance, such as acetone, which decomposes on heating to give ketene, at a high mass velocity, e. g., 2,000–50,000 lbs./sq./hr. and preferably 10,000–30,000 lbs./sq. ft./hr. thru a chamber heated to at least 675° C. and preferably to 700–850° C. with a time of contact maintained below 1.0 second but not so low that the conversion to ketene falls below 5%. Preferably the mass velocity and time of contact are adjusted so that the conversion is 10% or higher. The chamber or reactor is preferably a copper tube designed to permit a mass velocity up to 50,000 lbs./sq. ft./hr. without developing a back pressure above 5 atm. absolute and preferably not greater than 3 atm. absolute. These requirements are met by an empty copper tube having a length to diameter ratio of at least 75 but preferably of 75 to 500 or by a tubular reactor which altho having a length to diameter ratio somewhat less than 75 is designed to permit the desired heat transfer without introducing excessive back pressure when the desired mass thruput is obtained.

As a further means of securing satisfactory yields care is taken that the time of contact is high enough or that the mass velocity is low enough so that conversion does not fall below 5%.

The method of manufacture may be conveniently carried out by pumping liquid acetone at a suitable rate thru a copper tube heated by gas burners, or by an electric furnace, or any other desirable method. Initial heating of the acetone may be accomplished by heat exchange with the reaction products emerging from the reaction chamber, if desired. The maximum temperature attained within the reaction chamber is very carefully controlled and the rate of flow of acetone is adjusted so as to give the desired time of contact at the temperature used. Since the temperature to be employed, altho highly favorable for the decomposition of acetone to ketene, also has a strong tendency to decompose ketene, it is important that the contact time of the gases at such high temperatures be carefully controlled and it has been found that this can be done advantageously by spraying liquid acetone into the gases emerging from the reaction chamber at a rate sufficient to cool said gases below 600° C., whereby further decomposition of ketene is avoided. It will be apparent that the same object may also be accomplished by passing the gases from the reaction chamber immediately into a water-cooled condenser of the usual type.

The gases leaving the reaction chamber will consist of ketene and the methane equivalent to it, together with unchanged acetone and any carbon monoxide and ethylene which may have resulted from decomposition of the ketene. The acetone can be condensed by suitable cooling of the vapor mixture. The non-condensable gases, including ketene, are then used in any desired manner. For example, they may be washed with glacial acetic acid which combines readily with the ketene to form acetic anhyride.

The most satisfactory set of conditions are those wherein acetone is passed thru a copper tube, the maximum temperature of which is in the range 700°–850° C. and the flow adjusted so that the mol. per cent of acetone converted to ketene is in the range of 5% to 25%. The yield, i. e., the mols of acetone converted to ketene, divided by the mols of acetone converted to ketene plus other decomposition products, under these conditions will be dependent primarily, if not entirely, upon the conversion and will be in the range of 92% to 65%.

The reaction chamber may be made of a wide variety of materials, including copper, bronze, silver, quartz, sillimanite, and the like, but the use of materials including nickel and iron, as well as nickel-chromium alloys, should be avoided. Copper has been found to be the most practical material for the reaction chamber, unless temperatures above 1000° C. are to be used, in which event some higher melting point material naturally must be employed. Due to the short time of contact of the gases in the reaction chamber, a tube of relatively small diameter may be employed for large scale production. The time of contact of the gases according to the present method is far shorter than the time of contact used by prior investigators, and in all cases should be less than one second, and preferably should not exceed 0.3 second. The best results have been obtained by employing a contact time of 0.015–0.05 second. Within the limits disclosed, the time of contact should be increased for a constant temperature as the diameter of the reaction tube is increased, but should be materially decreased where excessively high temperatures, such as 1000° C. and up are employed.

It will be apparent to those skilled in the art that the temperature within the reaction tube will increase along the tube in the direction of flow of the reacting gases. The temperatures herein disclosed are those obtained at the hottest point along the tube. Since the rate of decomposition of the acetone increases so rapidly with temperature, it can be safely assumed that the decomposition takes place substantially entirely within that portion of the tube which is within 50° of the maximum temperature. The contact time of the gases, as disclosed herein, has been calculated as the number of seconds during which the vapors of acetone, at the reaction temperature, are permitted to remain within that portion of the tube which is within the 50° temperature range mentioned.

As an example of the calculation of the contact time of the gases, the following run is cited:

Rate of acetone feed 12.7 g. per min.=12.7/58= 0.219 mol./min.

Maximum temperature, 780° C.

Length of tube within range 730°–780° C., 39 in.

Inside diameter of tube, ⅛ in.

Vol. of reaction zone=$39\pi/16^2$=0.478 cu. in.= 7.8 cc.

Vol. of 1 mol. at 780° C.=22.4×1053/273=86.31.

Rate of flow in cc. of vapor at 780° per sec.=

$$\frac{86.3 \times 0.219 \times 1000}{60} = 314$$

Time of contact=7.8/314=0.025 sec.

The yields given herein are calculated as the percentages of the acetone decomposed which is recovered as ketene and the conversion is the percentage of the total acetone fed to the reaction tube which is recovered as ketene.

With a larger diameter tube, e. g., ¼ in. a greater length, e. g., 90–120 inches should be within the reaction zone, and with even larger tubes the length in the reaction zone should be correspondingly increased, i. e., the length to diameter ratio of the tube should be such as to allow the transfer of the necessary heat from the walls of the reaction tube to the acetone vapor.

In the following table are given the results of runs made according to the present method employing acetone. In all cases a copper tube was employed as the reaction chamber. Inspection of the table will reveal that, with the same tube, the time of contact required to produce a given conversion is considerably less at high temperature than at low temperature. The table also shows that with a reaction tube of ¼″ internal diameter a longer time of contact (which at a given rate of flow necessitates a larger tube) is necessary than with a reaction tube of ⅛″ internal diameter to obtain the same results:

| Diam. of tube in in. | Temp. °C. | Time of contact in sec. | Percent yield | Percent conversion | Mass velocity in lbs./ft.²/hr. | Space time yield in lbs. of ketene/cu. ft. of reac. tor/hour |
|---|---|---|---|---|---|---|
| ⅛ | 780 | 0.021 | 83 | 16 | 22,500 | 730 |
| ⅛ | 755 | 0.048 | 83 | 16 | 13,500 | 405 |
| ⅛ | 650 | 0.305 | 92 | 4 | 3,000 | 32 |
| ⅛ | 780 | 0.027 | 77 | 20 | 17,500 | 720 |
| ⅛ | 755 | 0.069 | 80 | 18 | 10,000 | 320 |
| ⅛ | 695 | 0.159 | 85 | 14 | 4,800 | 110 |
| ⅛ | 650 | 0.690 | 84 | 15 | 1,500 | 30 |
| ⅛ | 780 | 0.024 | 83 | 16 | 20,000 | 660 |
| ¼ | 780 | 0.040 | 84 | 15 | 12,000 | 145 |
| ¼ | 780 | 0.055 | 80 | 18 | 10,000 | 145 |

The reactor length divided by diameter for the above ⅛″ tube examples was between 310 and 480 and between 360 and 480 for the ¼″ tube examples. In most of the above examples the highest absolute pressure produced in the reactor was 1.2 atm. and in no case above 2.0 atm.

In order to operate either of the above tubes at a temperature of 850° C. with satisfactory yield the mass velocity must be increased to about 50,000 lbs./sq. ft./hour and the time of contact reduced to below 0.01 second. Under these conditions the back pressure will be under three atmospheres absolute and a conversion to ketene of 15 to 20% or higher can be attained.

It will be seen from the above table that in every run a yield of at least 77% was obtained with a conversion of around 15% in most instances. In carrying out the present invention it is more practical to employ a temperature of 725° C., or greater, with a contact time of less than 0.5 second due to the increased conversion of acetone to ketene. However, temperatures as low as 675° C. with a contact time of less than one second show higher yields than obtained by any prior investigators with a fair percent of conversion. Where temperatures materially above 850° C. are to be employed, the contact time must be reduced to a few thousandths of a second in order to obtain high yields due to the fact that decomposition of the products at such temperatures is very rapid.

An advantage of the present invention is that it gives higher yields and higher space-time-yields than hitherto obtainable using unobstructed, uncatalyzed reaction tubes, together with exceptionally high conversion percentages. For example, space-time-yields as high as 730 pounds of ketene per cubic foot of reactor within 50° C. of the maximum temperature per hour may be obtained whereas the highest space-time-yield of the prior art was not greater than 75 lbs./cu. ft./hour. A further advantage lies in the fact that the method of the present invention may be carried out employing empty tubes which naturally simplifies large scale operation materially. It will be understood that catalysts and metal network may be employed in the method but have little practical advantage. A most unexpected advantage of the present invention is the high yield obtained. Whereas it might have been predicted from the work of prior investigators that a higher temperature would give a higher conversion of acetone to ketene it seemed almost a certainty that the yields would decrease very rapidly. However, as shown by the table given herein, hitherto unobtainable yields and conversion percentages result by employing relatively high reaction temperatures, and short contact times.

The temperatures given herein are the temperatures of the walls of the reaction chambers and not of the gases within the reaction chambers, whose temperature may be slightly below that of the walls of the chambers inasmuch as the reaction is endothermic.

While atmospheric pressure experiments have been given in detail, the process can be operated at higher or lower pressures, better results being obtained at lower pressures.

The term "contact time of said vapors" as used in the claims means the time during which the vapors are in that portion of the reaction chamber which has a temperature within 50° C. of the temperature at the hottest point of the reaction chamber.

The term "reactor" is hereby defined as that portion of the chamber, in which ketene is formed by the pyrolysis of organic compounds, which is within 50° of the maximum chamber temperature.

As many apparently widely different embodiments of this invention may be made without departing from the spirit and scope thereof, it is to be understood that the invention is not limited to the specific embodiments thereof except as defined in the appended claims.

We claim:

1. Method of manufacturing ketene which comprises passing the vapors of organic compounds which are decomposed by heat into substances including ketene, thru a chamber heated to at least 675° C., the contact time of said vapors being less than 1.0 second.

2. Method of manufacturing ketene which comprises passing the vapors of organic compounds which are decomposed by heat into substances including ketene, thru a chamber heated to at least 675° C., the contact time of said vapors being less than 1.0 second, and immediately thereafter cooling said vapors to below 600° C.

3. Method of manufacturing ketene which comprises passing acetone vapors thru a chamber heated to above 725° C. with a time of contact sufficiently below 0.3 second so that the yield is greater than 65% but not so low that the conversion falls below 10%.

4. Methods of manufacturing ketene which comprises passing the vapors of acetone thru a chamber heated to at least 675° C., the contact time of the vapors being less than 1.0 second.

5. Method of manufacturing ketene which comprises passing the vapors of acetone thru a chamber heated to at least 675° C., the contact time of the vapors being less than 1.0 second, and immediately thereafter cooling said vapors to below 600° C. by bringing them into contact with liquid acetone.

6. Method of manufacturing ketene which comprises passing the vapors of acetone thru a chamber heated to 700°–850° C., the contact time of the vapors being less than 0.3 second.

7. Method of manufacturing ketene which comprises passing the vapors of acetone thru a chamber heated to 700–850° C., the contact time of the vapors being less than 0.3 second, and immediately thereafter cooling said vapors to below 600° C. by bringing them into contact with liquid acetone.

8. Method of manufacturing ketene which comprises passing the vapors of acetone thru an unobstructed copper tube heated to at least 675° C., the contact time of said vapors being less than 1.0 second.

9. Method of manufacturing ketene which comprises passing the vapors of acetone thru an unobstructed copper tube heated to at least 675° C., the contact time of said vapors being less than 1.0 second, and immediately thereafter cooling said vapors to below 600° C. by bringing them into contact with liquid acetone.

10. Method of manufacturing ketene which comprises passing the vapors of acetone thru an unobstructed copper tube heated to 700°–850° C., the contact time of said vapors being less than 0.3 second.

11. Method of manufacturing ketene which comprises passing the vapors of acetone thru an unobstructed copper tube heated to 700°–850° C., the contact time of said vapors being less than 0.3 second, and immediately thereafter cooling said vapors to below 600° C. by bringing them into contact with liquid acetone.

12. Method of manufacturing ketene which comprises passing the vapors of acetone thru an unobstructed copper tube at about 750° C., the contact time of the vapors being less than 0.5 second.

13. Method of manufacturing ketene which comprises passing the vapors of acetone thru an unobstructed copper tube at about 750° C., the contact time of the vapors being less than 0.5 second, and immediately thereafter cooling said vapors to below 600° C. by bringing them into contact with liquid acetone.

14. Method of manufacturing ketene which comprises passing acetone vapor thru a reactor at 675°–850° C. at a mass velocity of 2,000–50,000 lbs./sq. ft./hour with a time of contact below 1 second but above that at which the conversion is less than 5%.

15. Method of manufacturing ketene which comprises passing acetone vapor thru a reactor at 675°–850° C. at a mass velocity in excess of 2,000 lbs./sq. ft./hour but below that which induces a back pressure above 5 atmospheres with a time of contact below 1 second but above that at which the conversion is less than 5%.

16. Method of manufacturing ketene which comprises passing acetone vapor thru a reactor at 675°–850° C. at a mass velocity above 2,000 lbs./sq. ft./hour, said reactor being an unobstructed tube having a length to diameter ratio of at least 75.

17. Method of manufacturing ketene which comprises passing acetone vapor thru a reactor at 675°–850° C. at a mass velocity above 2,000 lbs./sq. ft./hour, said reactor being an unobstructed tube having a length to diameter ratio between 75 and 500.

GEORGE D. GRAVES.
CRAWFORD H. GREENEWALT.